United States Patent [19]
Ohata et al.

[11] Patent Number: 5,015,617
[45] Date of Patent: May 14, 1991

[54] CATALYST FOR PURIFYING EXHAUST GAS AND METHOD FOR PRODUCTION THEREOF

[75] Inventors: Tomohisa Ohata; Kazuo Tsuchitani; Shinya Kitaguchi, all of Himeji, Japan

[73] Assignee: Nippon Shokubai Kagaku Kogyo Co., Ltd., Osaka, Japan

[21] Appl. No.: 336,700

[22] Filed: Apr. 12, 1989

[30] Foreign Application Priority Data

Apr. 14, 1988 [JP] Japan ................... 63-90310
Apr. 14, 1988 [JP] Japan ................... 63-90311

[51] Int. Cl.$^5$ ............................................. B01J 21/06
[52] U.S. Cl. ..................... 502/304; 502/349
[58] Field of Search ........................... 502/304, 349

[56] References Cited

U.S. PATENT DOCUMENTS

| | | | |
|---|---|---|---|
| 3,850,847 | 11/1974 | Graham et al. | 502/304 |
| 3,903,020 | 9/1975 | Sergeys et al. | 502/304 |
| 4,189,404 | 2/1980 | Keith et al. | 502/304 |
| 4,316,822 | 2/1982 | Fujitani et al. | 502/304 |
| 4,427,576 | 1/1984 | Dupin | 502/218 |
| 4,476,246 | 10/1984 | Kim et al. | 502/304 |
| 4,587,231 | 5/1986 | Sawamura et al. | 502/304 |
| 4,591,580 | 5/1986 | Kim et al. | 502/304 |
| 4,714,694 | 12/1987 | Wan et al. | 502/304 |
| 4,753,915 | 6/1988 | Vogt et al. | 502/304 |
| 4,806,519 | 2/1989 | Chiba et al. | 502/252 |
| 4,904,633 | 2/1990 | Ohata et al. | 502/304 |

FOREIGN PATENT DOCUMENTS

| | | |
|---|---|---|
| 0170588 | 2/1986 | European Pat. Off. . |
| 0171151 | 2/1986 | European Pat. Off. . |
| 0329302 | 8/1989 | European Pat. Off. ........... 502/304 |
| 2595265 | 9/1987 | France . |
| 0119891 | 11/1974 | Japan .................... 502/304 |
| 0124442 | 9/1981 | Japan .................... 502/304 |
| 57-153737 | of 1982 | Japan . |
| 57-822382 | of 1982 | Japan . |
| 5279215 | of 1982 | Japan . |
| 57-24638 | 2/1982 | Japan . |
| 58-143838 | 8/1983 | Japan . |
| 60-171223 | of 1985 | Japan . |
| 61-11147 | of 1986 | Japan . |
| 61-157347 | 7/1986 | Japan . |
| 62-168544 | 7/1987 | Japan . |
| 63-23739 | 2/1988 | Japan . |
| 63-116741 | 5/1988 | Japan . |

OTHER PUBLICATIONS

Yao, H. C., "Surface Interactions in the System Rh/Al$_2$O$_3$", *Journal of Catalysis*, 50, pp. 407–418 (1977).

*Primary Examiner*—Patrick P. Garvin
*Assistant Examiner*—George R. Fourson
*Attorney, Agent, or Firm*—Omri M. Behr

[57] ABSTRACT

A catalyst for purifying exhaust gas produced by coating honeycomb carriers of monolithic structure with a catalyst composition comprising cerium oxide particles stabilized with (a) zirconia or (b) zirconia and at least one member selected from the group consisting of yttria and calcia, refractory inorganic oxide particles, 0.02 to 2% by weight of rhodium based on said catalyst composition, and 0 to 10% by weight of at least one platinum-family metal selected from the group consisting of platinum and palladium based on said catalyst composition.

25 Claims, 3 Drawing Sheets

FIG.1

T : TETRAGONAL

FIG.2

M : MONOCLINICAL

FIG.3

M : MONOCLINICAL
T : TETRAGONAL

FIG.4

T : TETRAGONAL

FIG.5
CALCINATION AT 1000°C FOR 100 HR

CATALYST FOR PURIFYING EXHAUST GAS AND METHOD FOR PRODUCTION THEREOF

BACKGROUND OF THE INVENTION

1. Field of the Invention

This invention relates to a catalyst for purifying exhaust gas and a method for production thereof. More particularly, it relates to a catalyst for purifying exhaust gas by simultaneous removal of such harmful components as hydrocarbons (HC), carbon monoxide (CO), and nitrogen oxides (NOx) contained in the exhaust gas from the internal combustion engine of an automobile, for example, especially a catalyst for purifying exhaust gas which retains outstanding durability even when it is used under such harsh conditions as experienced in an oxidizing atmosphere at elevated temperatures and which exhibits a high scrubbing performance at low temperatures to the harmful components.

2. Description of the Prior Art

Heretofore, there have been proposed numerous catalyts for purifying exhaust gas emanating from the internal combustion engine of an automobile, for example. At present, three-way catalysts for simultaneous removal of CO, HC, and $NO_x$ constitute the mainstream of the trend of the catalyst for purifying exhaust gas.

The three-way catalysts mentioned above are generally produced by depositing such active components as platinum (Pt), palladium (Pd), and rhodium (Rh) either singly or jointly as dispersed on such a refractory inorganic oxide as alumina or zirconia in a powdered form thereby preparing a catalyst composition and coating a monolithic carrier of cordierite, for example, with the catalyst composition. Of these three-way catalysts, that which has platinum-family metals including rhodium dispersed densely on activated alumina and also has cerium oxide (ceria incorporated in the catalyst composition is claimed to possess an outstanding purifying ability Further, the practice of adding to the catalyst active composition a promoter component selected from among the comounds of rare earth elements, the compounds of the elements of Group VIII, the alkali metal compounds, and the alkaline earth metal compounds for the purpose of promoting and stabilizing the catalytic activity of noble metals as the active component of catalyst is now in vogue. Particularly, cerium oxide ($CeO_2$), a rare earth compound, manifests a conspicuous effect as a promoter catalyst and has found widespread utility Generally, rhodium is a noble metal component which contributes in a large measure to the catalyst's ability to purify the waste gas of $NO_x$ and permit combustion at low temperatures. It has been known, however, that under such harsh conditions as experienced in an oxidizing atmosphere at elevated temperatures, rhodium is diffused in an alumina and consequently deprived of activity [refer to J. Catal., 50, 407 (1977)]and rhodium and ceria undergo undesirable interaction. In Japanese Patent Laid-open SHO 61(1986)-11,147, for example, it is disclosed that the interaction of rhodium and alumina is diminished by regulating the particle diameter of rhodium. This method, however, necessitates intricate steps as for wet reduction. We have confirmed that this method is not sufficient for the purpose of curbing the interaction of rhodium and ceria. As ways of incorporating ceria in the catalyst composition, a method which comprises depositing ceria on the catalyst composition by impregnating activated alumina with a solution of ceria and a method effects the incorporation by pouring the bulk of an oxide, hydroxide, or carbonate of cerium into the other components of the catalyst composition have been known. When the ceria is deposited as on activated alumina, however, a disadvantage ensues that the ceria particles are liable to grow and the ceria is deficient in thermal stability. When the bulk of cerium, compound is poured into the catalyst composition, there is a disadvantage that the consumption of ceria is so large as to render the produced catalyst very expensive and the frequency of contact between ceria and rhodium is increased to an extent of inducing an undesirable interaction and consequent loss of activity. Japanese Patent Laid-Open SHO 60(1985)-171,223 and Japanese Patent Laid-Open SHO 62(1987)-168,544 have a disclosure to the effect that all the rare earth elements are as effective in stabilizing zirconium as yttrium, calcium, and magnesia. The effect which such rare earth elements used in a catalyst are to manifest in aiding in the catalysis remains yet to be clarified.

In the field of catalysts, zirconia is used mostly for the purpose of stabilizing the specific surface area and other similar physical properties of the catalyst composition. As concerns the use of zirconia as a carrier for a platinum-family metal, various methods are proposed as in Japanese Patent Publication SHO 57(1982)-29,215 and Japanese Patent Laid-Open SHO 57(1982)-153,737, for example.

Zirconia possesses highly desirable properties as a carrier for a platinum-family metal. It nevertheless is highly susceptible of thermal deterioration and liable to undergo heavy loss of activity during a protracted use at elevated temperatures. An invention which consists in using zirconia as a thermally stable sintered article is disclosed, for example, in Japanese Patent Publication SHO 57(1982)-2,382. The thermally stable sintered article of zirconia is deficient in binding force with such catalyst components as platinum-family metal and ceria and liable to induce growth of particles of the active component and growth of crystals and, as a result, the produced catalyst suffers from low thermal stability and poor durability.

An object of this invention, therefore, is to provide a novel catalyst for purifying exhaust gas and a method for the production thereof.

Another object of this invention is to provide a catalyst for purifying exhaust gas which retains outstanding durability when it is used under such harsh conditions as encountered in an oxidizing atmosphere at elevated temperatures and exhibits a high scrubbing ability at low temperatures to the harmful components contained in the exhaust gas.

SUMMARY OF THE INVENTION

The objects of the invention described above are accomplished by a catalyst for purifying exhaust gas produced by coating honeycomb carriers of monolithic structure with a catalyst composition comprising cerium oxide particles stabilized with (a) zirconia or (b) zirconia and at least one member selected from the group consisting of yttria and calcia, refractory inorganic oxide particles, 0.02 to 2% by weight, based on the amount of catalyst composition, of rhodium, and 0 to 10% by weight, based on the amount of catalyst composition, of at least one platinum-family metal selected from the group consisting of platinum and palladium.

In the present invention, it has been found that the durability characteristic of rhodium is prominently improved by allowing rhodium to be incorporated in the catalyst composition as deposited in a high concentration on particles of such a refractory inorgaic oxide as alumina, and adjusted in the form of aggregate particles of a relatively large average diameter.

It has been further found that an amorphous ceria compound excellent in thermal stability and promoting effect is obtained by depositing ceria as dispersed on zirconia or zirconium hydroxide of a high surface area and this amorphous ceria hardly undergoes an interaction with rhodium. It has been also found that the catalyst composition which contains the inorganic oxide carrying rhodium in a high concentration obtained as described above and the ceria stabilized with zirconia inhibits the undesirable interaction with rhodium and retains outstanding durabiity and low-temperature activity even when it is used under such harsh conditions as encountered in an oxidizing atmosphere at elevated temperatures. This invention has been completed as the result.

The objects described above are also accomplished by a method for the production of a catalyst for purifying exhaust gas, which comprises preparing a catalyst composition composed of a refractory inorganic oxide having rhodium carried therein in an amount in the range of 0.02 to 2 % by weight based on the amount of the catalyst composition, cerium oxide particles stabilized with (a) zirconia or (b) zirconia and at least one member selected from the group consisting of yttria and calsia, and refractory inorganic oxide particles having carried thereon 0 to 10% by weight, based on the amount of the catalyst composition, of at least one platinum-family metal selected from the group consisting of platinum and palladium, converting the catalyst composition into an aqueous slurry, coating honeycomb carriers of monolithic structure with the aqueous slurry, and subsequently drying the resultant coated carrier.

EXPLANATION OF THE PREFERRED EMBODIMENT

The catalyst composition to be used in the present invention comprises cerium oxide stabilized with (a) zirconia or (b) zirconia and at least one member selected from the group consisting of yttria and calcia, refractory inorganic oxide particles, rhodium and optionally at least one platinum-family metal selected from the group consisting of platinum and palladium. In this catalyst composition, the rhodium is deposited either alone or in combination with the platinum-family metal on the stabilized cerium oxide particles and/or the refractcry inorganic oxide particles.

The amount of rhodium to be carried is in the range of 0.02 to 2% by weight, preferably 0.1 to 1 % by weight, based on the amount of the catalyst composition. Preferable method for supporting rhodium resides in supporting in an amount of 1–20 % by weight of high supporting concentration to the refractory inorganic oxide particles. If this amount is less than 1% by weight, the deposited rhodium assumes a state approximating to that of ordinary high dispersion, undergoes a heavy interaction with the refractory inorganic oxide such as alumina, and fails to retain desired durability. If this amount exceeds 20% by weight, the initial performance is low and the rhodium particles are liable to grow during the course of use. When the composition of the refractory inorganic oxide supported rhodium is prepared in the form of aggregate particles having a relatively large average diameter of 0.5 to 20$\mu$m, preferably 1 to 10 $\mu$m and then dispersed in the catalyst composition, it serves to mitigate the interaction or reaction of rhodium with the refractory inorganic oxide or promoter substance without impairing the efficiency of the reaction for exhaust gas scrubbing.

The refractory inorganic oxides which are usable herein include alumina, silica, titania, and zirconia, for example It is particularly desirable to use alumina, especially activated alumina in the crystalline form of $\gamma$, $\delta$, or $\theta$.

The method for the deposition of the platinum-family metal including rhodium is not specifically defined The conventional method of impregnation may be used for the deposition, for example. The composition can be obtained by thoroughly mixing the aqueous solution of a rhodium salt such as rhodium nitrate, rhodium chloride, or rhodium sulfate with the refractory inorganic oxide in the form of particles and then drying and calcining the resultant mixture. The calcination temperature is in the range of 300° to 700° C., preferably 400° to 600° C.

The cerium oxide composition stabilized with zirconia which constitutes the second characteristic of the present invention is obtained by impregnating zirconia or an amorphous zirconium hydrate such as zirconium hydroxide in the form of minute particles of a large surface area in the range of 60 to 200 m$^2$/g, preferably 80 to 200 m$^2$/g, with the aqueous solution of a cerium salt and then drying the impregnated particles and calcing them at a temperature in the range of 400° to 700° C., preferably 500° to 600° C. The cerium salts which are usable herein include cerium nitrate, cerium sulfate, cerium chloride, and cerium oxalate, for example.

The content of ceria in the cerium oxide composition stabilized with zirconia is desired to be in the range of 10 to 50% by weight, preferably 20 to 30% by weight. When the ceria content is in the preferred range of 20 to 30% by weight, the produced composition has ceria uniformly formed solid solutions.

The powdered zirconia-stabilized cerium oxide composition may otherwise be produced by causing coprecipitation of the cerium salt with a zirconium salt.

The powdered zirconia-stabilized cerium oxide composition produced as described above, on analysis by X-ray diffraction, shows a crystalline structure solely of zirconia. When this powder is calcined in the air at 900° C. for 10 hours, it shows in the X-ray diffraction diagram a curve for the teragonal crystal of zirconia, indicating that the zirconia is stabilized in the tetragonal crystal by the ceria, as compared with the zirconia powder containing no ceria and showing a peak for the monoclinic crystal. The calcination is preferable to be carried preferably out at a temperature in the range of 400° to 700° C.

Further, the specific surface area to be measured after 10 hours' calcination in the air at 900° C. is not more than 10 m$^2$/g in the case of the zirconia powder containing no ceria and not less than 30 m$^2$/g in the care of the powdered zirconia-stabilized cerium oxide composition containing ceria in the range of 10 to 50 % by weight. This comparison clearly indicates that the incorporation of ceria serves to stabilize thermally the composition.

When a sintered article of zirconia which has acquired a specific surface area of less than 60 m$^2$/g as the result of heat treatment, for example, is used as a zirconia source, no solid solution is obtained as evinced by the fact that the X-ray diffraction shows crystalline structures for both ceria and zirconia.

If the ceria content in the powdered zirconia-stabilized cerium oxide composition is less than 10% by weight based on the amount of zirconia, a peak for the monoclinic crystal of zirconia partly appears after 10 hours' calcination at 950° C. If the ceria content exceeds 50% by weight, a peak for ceria appears.

The powdered zirconia-stabilized cerium oxide composition is enabled to bring about a still better effect when the zirconia-stabilized cerium oxide is further stabilized with yttria and/or calcia. The content of yttria and/or calcia in the cerium oxide composition which has been stabilized with zirconia and yttria and/or calcia is in the range of 0.5 to 15% by weight, preferably 1 to 5 % by weight. The stabilized cerium oxide composition is identified by the fact that the X-ray diffraction diagram of the composition shows no peak for the crystal of ceria. Stabilization with yttria and/or calcia may be carried out by impregnating a yttrium and/or calcium salt to zirconia or zirconium hydrate during or after impregnating a cerium salt to zirconia or zirconium hydrate, drying and calcining. The calcination temprature is 400° to 700° C, preferably 500° C. to 600° C.

The stabilized cerium oxide of this invention is such that even after it has been exposed to an oxidizing atmosphere at an elevated temperature of not less than 800° C., the X-ray diffraction diagram thereof does not show a peak for the crystal of ceria or yttria but shows mainly a peak for the tetragonal crystal of zirconia. The absence of the peak for the crystal of ceria or yttria from the X-ray diffraction diagram may be logically explained by a supposition that cerium and yttrium both form a solid solution with zirconia or they are deposited as idealy dispersed in the interstices between the zirconia particles.

It has been confirmed 'y us that the yttrium and calcium incorporated in the composition are effective in stabilizing the zirconia and, at the same time, in altering the condition of oxidation of ceria. The result of the test by the method of X-ray photoelectric spectroscopy shows that the incorporation of yttrium or calcium brings about an addition to the oxidation number of Ce. This fact suggests that active oxygen seeds have been formed on the surface of ceria.

The stabilized cerium oxide thus obtained is contained in a concentration in the range of 10 to 80% by weight, preferably 20 to 40% by weight, based on the total amount of the catalyst composition. The incorporation of the stabilized cerium oxide in combination with the platinum-family metal permits production of a highly satisfactory exhaust gas scrubbing catalyst for use in the internal combustion engine.

The rhodium is carried on the particles of the cerium oxide composition stabilized with zirconia alone or with zirconia in combination with yttria or calcia and/or the particles of refractory inorganic oxide as described above. Optionally, particles of a refractory inorganic oxide carrying no rhodium may be additionally incorporated in the catalyst composition. When a refractory inorganic oxide such as activated alumina or silica prepared with a large surface area is incorporated in the catalyst composition, it enables the catalyst composition to acquire a physical effect such as, for example, diffusion of gas. When the refractory inorganic oxide has a rare earth element, a base metal element such as iron, chromium, manganese, or nickel, or a platinum-family metal other than rhodium carried thereon, the produced catalyst composition enjoys a further improvement in the purifying ability.

The platinum-family metal other than rhodium, when necessary, may be deposited on the refractory inorganic oxide carrying rhodium, the cerium oxide stabilized solely by zirconia or jointly by zirconia and yttria and/or calcia, or the refractory inorganic oxide not carrying rhodium. The amount of the platinum-family metal thus deposited is in the range of 0 to 10% by weight, more desirably 0.001 to 5% by weight, and most desirably 0.5 to 2% by weight. This deposition is effected in the same manner as that of rhodium mentioned above.

From the compositions obtained as described above, a finished catalyst is produced by converting these compositions into an aqueous slurry by the use of a ball mill, wash coating honeycomb carriers of monolithic structure, for example, with the aqueous slurry, then drying the coated honeycomb carriers, and optionally calcining the dry coated honeycomb carriers. The calcination temperature is in the range of 100° to 700° C., preferably 150° to 500° C.

The honeycomb carriers of monolithic structure which are usable in this invention include carriers of such ceramic substances as cordierite, mullite, and α-alumina and metallic monolithic carriers made of stainless steel and Fe—Cr—Al alloy, for example. The amount of the catalyst composition to be carried per liter of these carriers is in the range of 50 to 300 g, preferably 100 to 250 g.

Now, the present invention will be described more specifically below with reference to working examples. It should be noted, however, that this invention is not limited to these examples.

EXAMPLE 1

With 100 ml of an aqueous solution of 50 g of cerium nitrate [Ce(NO$_3$)$_3$. 6H$_2$O], 50 g of minute particles of zirconia having a specific surface area of 92 m$^2$/g (produced by Daiichi Kigenso K.K.) were impregnated and mixed. Then the impregnated minute particles were thoroughly dried and calcined at 500° C for one hour. (The product was labeled as "sample No. 1.")

Control 1

Sample a was obtained by following the procedure of Example 1, except that alumina γ-alumina) having a specific surface area of 155 m$^2$/g was used in place of zirconia.

Control 2

Sample b was obtained by following the procedure of Example 1, except that zirconia having a specific surface area of 45 m$^2$/g was used instead.

EXAMPLE 2

Sample No. 2 was obtained by following the procedure of Example 1, except that the amount of cerium nitrate was changed to 100 g.

Control 3

Sample c was obtained by following the procedure of Example 1, except that the amount of cerium nitrate was changed to 200 g.

EXAMPLE 3

With an aqueous rhodium chloride solution containing 0.5 g of rhodium, 5 g of alumina ($\gamma$-Al$_2$O$_3$) having a specific surface area of 90 m$^2$/g was impregnated. Then, the impregnated alumina was thoroughly dried and subsequently calcined at 500° C for one hour.

Then, 200g of alumina ($\gamma$-al$_2$O$_3$) having a specific surface area of 155 m$^2$/g was impregnated with an aqueous platinum chloride solution containing 2.5 g of platinum, to obtain platinum-containing alumina. In a ball mill, the two powders obtained as described above and 100 g of cerium compound obtained in the same manner as in Example 1 were wet pulverized for 20 hours, to obtain an aqueous slurry. Monolithic carriers of cordierite (33 mm in inside diameter and 76 mm in length) possessing about 400 cells per square inch of cross section were immersed in the aqueous slurry, removed from the slurry, blown with compressed air to remove excess slurry from the cells, and then dried, to obtain a catalyst 3. The coating layer of the catalyst was photographed in 3,000 magnifications at 300 randomly selected points and analyzed for distribution of platinum and rhodium by electron probe micro analysis (EPMA), to find that rhodium-containing alumina was dispersed in the form of particles having an average diamter of 3 $\mu$m and absolutely no platinum was aggregated in the form of particle. By the fluorescent X-ray test, the catalyst 3 was found to contain 0.081 g of platinum, 0.016 g of rhodium, and 0.90 g of CeO$_2$ per catalyst.

EXAMPLE 4

Alumina containing rhodium and platinum was obtained by impregnating 10 g of alumina ($\gamma$-Al$_2$O$_3$) having a specific surface area of 155 m$^2$/g with a mixed solution of rhodium chloride and platinic chloride containing 0.5 g of rhodium and 2.5 g of platinum, drying the impregnated alumina, and then calcining the dried alumina at 500° C for one hour. In a ball mill, the powder thus obtained 80 g of cerium compound obtained in the same manner as in Example 2, and 210 g of $\gamma$-alumina were wet pulverized to obtain an aqueous slurry. Thereafter, Catalyst 4 was obtained by following the procedure of Example 3. By the EPMA analysis, the coating layer of this catalyst was found to contain the platinum and rhodium-containing alumina as dispersed in the form of particles having an average diameter of 5$\mu$m. The amount of the catalyst carried was as shown in Table 1.

Control 4

An aqueous solution of rhodium chloride and platinic chloride containng 0.5 g of rhodium and 2.5 g of platinum was diluted with purified water. Then, 220 g of $\gamma$-alumina having a specific surface area of 155 m$^2$/g was impregnated with the diluted aqueous solution, dried, and then calcined at 500° C. for one hour. In a ball mill, the powder thus obtained and 80 g of commercially available cerium oxide were wet pulverized, and treated by following the procedure of Example 3, to obtain catalyst d. When the coating layer of this catalyst was tested by EPMA, neither platinum nor rhodium was detected in the form of particles exceeding 0.5$\mu$m in diameter. The amount of the catalyst carried was as shown in Table 1.

Control 5

Platinum-containing alumina was obtained by impregnating 100 g of $\gamma$-alumina with an aqueous solution of platinic chloride containing 2.5 g of platinum, and then drying and calcining the impregnated $\gamma$-alumina. In a ball mill, the powder thus obtained and 80 g of commercially available cerium oxide were wet pulverized, to obtain an aqueous slurry. Then, 120 g of $\gamma$-alumina was impregnated with an aqueous solution of rhodium chloride containing 0.5 g of rhodium and the resultant impregnated $\gamma$- alumina was pulverized in a ball mill, to obtain an aqueous slurry. The rhodium in the aqueous slurry was fixed by passing hydrogen sulfide gas through the rhodium-containing aqueous slurry.

Monolithic carriers were wash coated with the mixture of the two slurries obtained as described above. The coated carriers were dried and calcined at 400° C for one hour to obtain a finished catalyst e. When the coating layer of this catalyst was tested by EPMA, neither platinum nor rhodium was found to be contained in the form of particles exceeding 0.5 $\mu$m in diameter. The amount of catalyst carried was as shown in Table 1.

EXAMPLE 5

With an aqueous solution of rhodium nitrate containing 0.3 g of rhodium, 5 g of $\delta$-alumina having a specific surface area of 90 m$^2$/g was impregnated. The impregnated $\delta$-alumina was thoroughly dried and then calcined at 500° C. for one hour, to obtain rhodium-containing alumina. Then, 100 g of cerium compound obtained in Example 2 was impregnated with an aqueous solution of palladium nitrate containing 3.0 g of palladium and then dried and calcined at 500° C for one hour.

An aqueous slurry was prepared by wet pulverizing the two powders obtained as described above and 200 g of $\delta$-alumina and then processed by following the procedure of Example 3, to obtain catalyst 5. When the coating layer of this catalyst was tested by EPMA, the rhodium-containing alumina was found to be dispersed in the form of particles having an average diameter of 6 $\mu$m. The amount of catalyst carried was as shown in Table 1.

Control 6

In a ball mill, 300 g of ceria-containing alumina obtained in the as same manner as in Control 1 was wet pulverized to prepare an aqueous slurry and then processed by following the procedure of Example 3 to obtain wash coated monolithic carriers. Then, the carriers were calcined at 500° C for one hour, impregnated with an aqueous solution of palladium chloride and rhodium chloride, dried, and then calcined at 500° C. to obtain catalyst f. When the coating layer of the catalyst as tested by EPMA, neither palladium nor rhodium was detected in the form of particles exceeding 0.5 μm in diameter. The amount of bat'lyrt carried was as shown in Table 1.

TABLE 1

| Example No. | Catalyst No. | Pt | Pd | Rh | CeO₂ |
|---|---|---|---|---|---|
| Example 3 | 3 | 0.081 | — | 0.016 | 0.90 |
| Example 4 | 4 | 0.080 | — | 0.016 | 1.15 |
| Control 4 | d | 0.082 | — | 0.016 | 2.60 |
| Control 5 | e | 0.081 | — | 0.016 | 2.55 |
| Example 5 | 5 | — | 0.096 | 0.010 | 1.43 |
| Control 6 | f | — | 0.102 | 0.010 | 2.73 |

(g/pc)

EXAMPLE 6

The samples obtained in Examples 1 and 2 Controls 1 to 3 and the same samples further calcined at 1,000° C. for 10 hours were subjected to X-ray diffraction. The peaks consequently obtained are shown in Table 2.

Separately, the samples of Example 1 and Control 1 and commercially available ceria (having a specific surface area of 70 m²/g) calcined at 1,000° C. for 10 hours for comparison were tested for capacity for oxygen storage. The results were as shown in Table 3. This test was carried out with a conventional flow type apparatus by reducing a sample in hydrogen at 500° C and then feeding oxygen pulses to the sample under continued flow of helium thereby determining the amount of oxygen consumed by the sample. From the results of Table 2 and Table 3, it is noted that the ceria compound obtained in accordance with this invention does not induce growth of ceria crystals but retains a highly desirable capacity for oxygen storage even after exposure to an oxidizing atmosphere at the elevated temperature of 1,000° C.

TABLE 2

| Sample No. | CeO₂ content (% by weight) | One hour' calcination at 500° C. | Ten hour' calcination at 1,000° C. |
|---|---|---|---|
| 1 | 29 | ZrO₂ (monoclinic) | ZrO₂ (tetragonal) |
| 2 | 44 | ZrO₂ (monoclinic) | ZrO₂ (tetragonal) |
| a | 29 | Al₂O₃ (γ), CeO₂ | Al₂O₃ (δ, θ, α), CeO₂ |
| b | 29 | ZrO₂ (monoclinic), CeO₂ | ZrO₂ (monoclinic), CeO₂ |
| c | 61 | ZrO₂ (monoclinic), CeO₂ | ZrO₂ (tetragonal), CeO₂ |

TABLE 3

| Sample No. | Oxygen consumption (mol) per mol of Ce |
|---|---|
| 1 | $9.8 \times 10^{-2}$ |
| a | $0.1 \times 10^{-2}$ |
| Commercially available ceria | $0.2 \times 10^{-2}$ |

EXAMPLE 7

The catalysts, Nos. 3 to 5, and the catalysts, Nos. d to f, for comparison were aged in an electric oven and then tested for catalyic performance. The aging in the electric oven was carried out under very harsh conditions of oxidizing atmosphere at an elevated temperature, i.e. in the air at 900° C., for 20 hours.

The evaluation of the catalytic performance was effected by the use of an electronically controlled engine 4 cylinders 1,800 cc), with the catalyst inlet gas temperature varied continuously with a heat exchanger from 200° to 450° C., to find rations of removal of CO, HC, NO$_x$. In this case, the engine was operated with the space velocity (S.V.) fixed at 90,000 hr⁻¹, the average air/fuel ratio (A/F) fixed at 14.6, and the vibration at ±0.5 A/F 1 Hz. The catalyst inlet gas temperature at which the ratios of removal of CO, HC, and NO$_x$ reached 50% (T50) and the ratio of purification (%) at 450° C were as shown in Table 4.

The catalysts which had undergone the durability test in the engine were similarly tested for catalytic performance. In the durability test, an electronically controlled engine (8 cylinders 4,400 cc) was operated in the mode of 60 seconds of steady driving and 6 seconds of decelerated driving (during which period the fuel was cut and the catalyst was exposed to an oxidizing atmosphere at elevated temperature). Thus, the catalyst was aged for 50 hours under conditions such that the catalyst temperature would reach 800° C in the steady driving.

The evaluation of the sample for catalytic performance after the durable test with the engine was carried out in the same manner as described above. The results were as shown in Table 5. It is clearly noted from the results of Tables 4 and 5 that the catalyst disclosed by the present invention experiences sparing deterioration and retains highly desirable durability not merely under the normal engine driving conditions but also under such harsh conditions as encountered in an oxidizing atmosphere at an elevated temperature.

TABLE 4

| Catalyst No. | Temperature for 50% conversion (°C.) | | | Ratio of purification (%) at 450° C. | | |
|---|---|---|---|---|---|---|
| | CO | HC | NO | CO | HC | NO |
| 3 | 372 | 375 | 369 | 85 | 83 | 87 |
| 4 | 365 | 371 | 360 | 88 | 87 | 88 |
| d | 426 | 431 | 422 | 69 | 65 | 71 |
| e | 403 | 410 | 401 | 72 | 70 | 72 |
| 5 | 355 | 358 | 356 | 97 | 98 | 96 |
| f | 394 | 397 | 399 | 83 | 85 | 82 |

TABLE 5

| Catalyst No. | Temperature for 50% conversion (°C.) | | | Ratio of purification (%) at 450° C. | | |
|---|---|---|---|---|---|---|
| | CO | HC | NO | CO | HC | NO |
| 3 | 341 | 345 | 337 | 92 | 87 | 91 |
| 4 | 337 | 340 | 335 | 95 | 92 | 93 |
| d | 389 | 393 | 382 | 80 | 77 | 81 |
| e | 372 | 379 | 370 | 83 | 78 | 83 |
| 5 | 368 | 370 | 368 | 90 | 92 | 88 |
| f | 401 | 405 | 407 | 77 | 81 | 72 |

EXAMPLE 8

A zirconia-stabilized cerium oxide (hereinafter referred to as "Ce-ZrO₂") powder containing 26% by weight of ceria was prepared by mixing an aqueous solution of cerium nitrate and zirconia having a specific surface area of 82 m²/g, drying the resultant mixture, and then calcining the dry mixture in the air at 500° C. for two hours.

Then, a mixed powder comprising 20 g of the Ce—ZrO₂ and 80 g of activated alumina having a specific surface area of 100 m²/g was impregnated with an aqueous rhodium nitrate solution containing 0.1 g of rhodium. The impregnated powder was dried and then calcined in the air at 500° C for two hours, to prepare a catalyst composition.

This catalyst composition was converted into a slurry. Cylindrical monolithic carriers of cordierite 33 mm in outside diameter and 76 mm in length possessing about 400 gas-passing cells per square inch of cross section were coated with the catalyst composition slurry and then dried at 130° C for three hours, to obtain a finished catalyst carrying 6.5 g of the catalyst composition.

Figure 1:
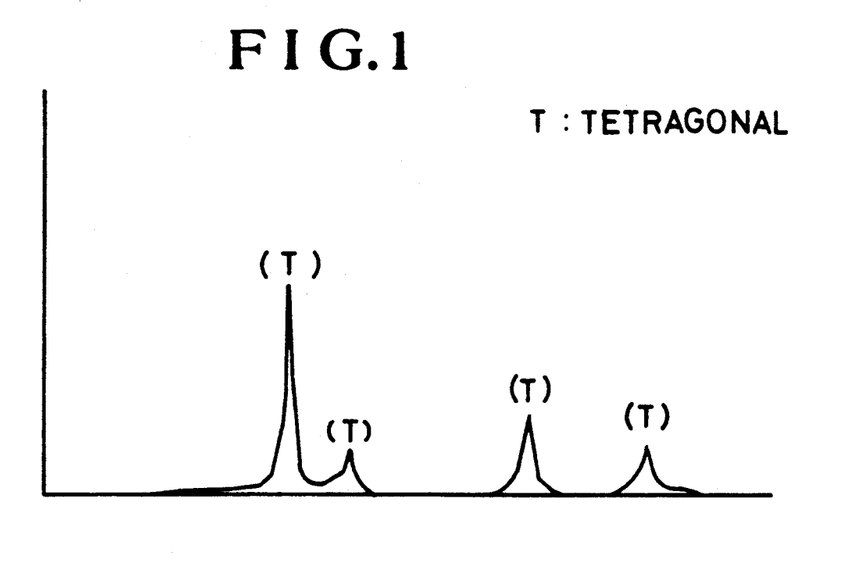
FIG. 1 is an X-ray diffraction diagram of a typical catalyst according to this invention.

Part of the aforementioned Ce—ZrO$_2$ powder containing 26% by weight of ceria was calcined in the air at 900° C. for ten hours and subjected to X-ray diffraction. The X-ray diffraction diagram showed only a peak for the tetragonal crystal of zirconia as illustrated in FIG. 1. The calcined Ce—ZrO$_2$ powder was found to possess a specific surface area of 42 m$^2$/g.

EXAMPLE 9

A finished catalyst was obtained by following the procedure of Example 8, except that a Ce—ZrO$_2$ powder containing 13% by weight of ceria was used and rhodium was carried on a mixed powder comprising 50 g of the Ce—ZrO$_2$ powder and 50 g of activated alumina

Control 7

A catalyst composition was prepared by impregnating 80 g of activated alumina having a specific surface area of 100 m$^2$/g with a mixed aqueous solution containing 5 2 g of cerium nitrate as ceria, 14.8 g of zirconium nitrate as zirconia, and 0.1 g of rhodium nitrate as rhodium, drying the impregnated activated alumina, and calcing the dry alumina in the air at 500° C.

This catalyst composition was converted into a slurry. In the same manner as in Example 8, monolithic carriers were coated with the slurry to obtain a finished catalyst carrying 6.5 g of the catalyst composition.

Control 8

A mixed powder comprising of 10 g of ceria powder having a specific surface area of 62 m$^2$/g, 60 g of activated alumina powder having a specific surface area of 100 m$^2$/g, and 30 g of zirconia powder having a specific surface area of 82 m$^2$/g was impregnated with an aqueous solution containing 0.1 g of rhodium nitrate as rhodium. The impregnated powder was dried and then calcined at 500° C, to prepare a catalyst composition. From this catalyst composition, a finished catalyst carrying 6.5 g of the catalyst composition was obtained by following the procedure of Example 8.

Control 9

A finished catalyst was obtained by following the procedure of Example 8, except that a zirconia powder having a specific surface area of 38 m$^2$/g was used instead.

Figure 2:
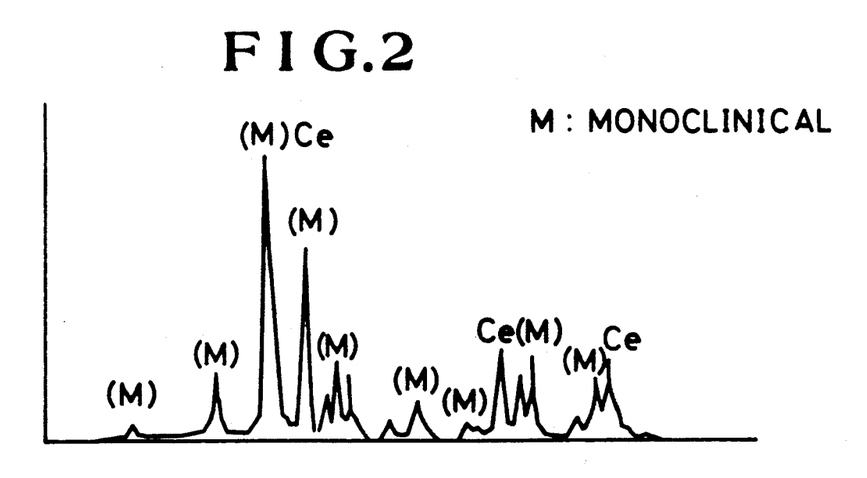
FIGS. 2 to 4 are X-ray diffraction diagrams of catalysts for comparison.

Part of the Ce—ZrO$_2$ powder obtained herein was calcined in the air at 900° C for ten hours and subjected to X-ray diffraction. The X-ray diffraction diagram showed a peak for the monoclinic crystal of zirconia and a peak for ceria as illustrated in FIG. 2. The calcined powder was found to have a specific surface area of 9.8 m$^2$/g.

Control 10

Figure 3:
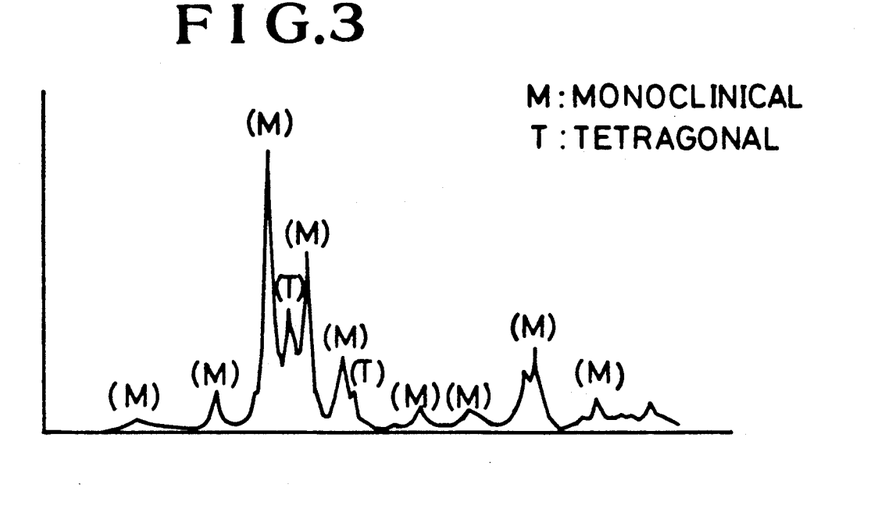

A finished catalyst was obtained by following the procedure of Example 8, except that a Ce—ZrO$_2$ powder containing 7% by weight of ceria was used and rhodium was carried on a mixed powder comprising 80 g of the Ce—ZrO$_2$ powder and 20 g of activated alumina Part of the Ce—ZrO$_2$ powder containing 7% by weight of ceria was calcined in the air at 900° C for ten hours and subjected to X-ray diffraction. The X-ray diffraction diagram showed a main peak for the monoclinic crystal of zirconia and a peak for the tetragonal crystal of zirconia as illustrated in FIG. 3. The calcined powder was found to possess a specific surface area of 28 m$^2$/g.

Control 11

A finished catalyst was obtained by following the procedure of Example 8, except that a Ce—ZrO$_2$ powder containing 85% by weight of ceria was used instead and rhodium was carried on a mixed powder comprising 15 g of the Ce—ZrO$_2$ powder and 85 g of activated alumina.

Figure 4:
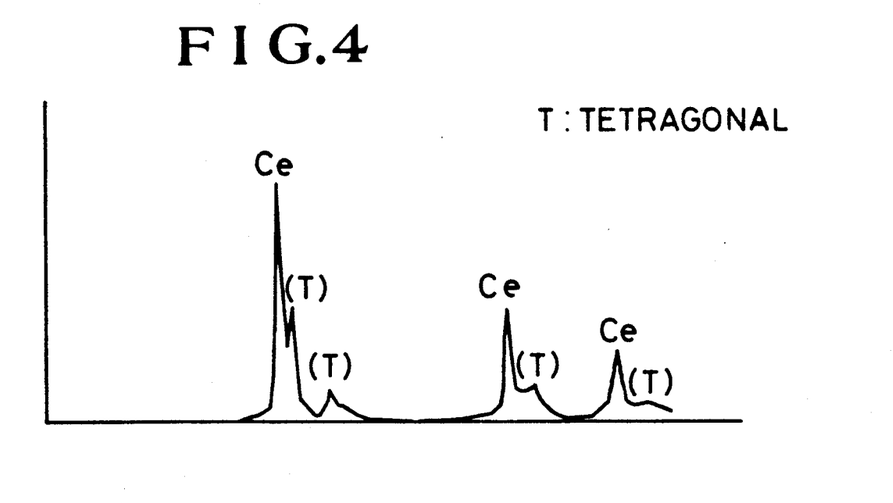

Part of the Ce—ZrO$_2$ powder containing 85% by weight of ceria was calcined in the air at 900° C for ten hours and then subjected to X-ray diffraction. The X-ray diffraction diagram showed a peak for ceria and partly a peak for the tetragonal crystal of zirconia as illustrated in FIG. 4. The calcined powder was found to possess a specific surface area of 3.1 m$^2$/g.

EXAMPLE 10

A Ce—ZrO$_2$ powder containing 28% by weight of ceria based on zirconia was prepared by mixing an aqueous solution of cerium nitrate and zirconium hydroxide having a specific surface area of 98 m$^2$/g, drying the resultant mixture, and calcining the dry mixture in the air at 500° C for two hours.

Then, a mixed powder comprising of 25 g of the Ce—ZrO$_2$ powder mentioned above and 115 g of a activated alumina containing 3% by weight of ceria and 1% by weight of iron oxide and having a specific surface area of 123 m$^2$/g was impregnated with a mixed aqueous solution of containing 0.2 g of rhodium nitrate as rhodium and 1 g of palladium nitrate as palladium. The impregnated powder was dried and then calcined in the air at 500° C. to prepare a catalyst composition This catalyst composition was converted into a slurry. In the same manner as in Example 8, monolithic carriers were coated with the slurry to obtain a finished catalyst carrying 9.2 g of the catalyst composition.

EXAMPLE 11

A Ce—ZrO$_2$ powder containing 23% by weight of ceria was prepared by treating a mixed aqueous solution of cerium nitrate and zirconium nitrate with aqua ammonia thereby inducing coprecipitation of the salts, removing the coprecipitate, drying and calcining in the air at 500° C. for two hours. This Ce—ZrO$_2$ powder was found to have a specific surface area of 91 m$^2$/g.

Then, a finished catalyst carrying 9.2 g of a catalyst composition was obtained by following the procedure of Example 10, except that the Ce—ZrO$_2$ powder prepared by the coprecipitation method was used instead.

EXAMPLE 12

A finished catalyst was obtained by following the procedure of Example 10, except that amorphous zirconia having a specific surface area of 82 m$^2$/g was used as the zirconia source for the Ce—ZrO$_2$ powder

Control 12

A finished catalyst was obtained by following the procedure of Example 10, except that a zirconia powder having a specific surface area of 42 m²/g was impregnated with cerium nitrate and a Ce—ZrO₂ powder containing 28% by weight of ceria based on zirconia was prepared instead.

Control 13

A catalyst composition was prepared by mixing a mixed powder comprising 115 g of activated alumina containing 5% by weight of ceria and 1% by weight of iron oxide and having a specific surface area of 123 m²/g and 18 g of amorphous zirconia powder having a specific surface area of 82 m²/g and 7g of cerium nitrate as ceria, 0.2 g cf rhodium nitrate as rhodium, and 1 g of palladium nitrate as palladium, drying the resultant mixture, and calcining the dry mixture in the air at 500° C for two hours.

From this catalyst composition, a finished catalyst carrying 9.2 g of the catalyst composition was obtained by coating monolithic carriers with the catalyst composition in the same manner as in Example 10.

The amounts of catalyst components carried per liter of each of the finished catalysts of Examples 8 to 12 and Controls 7 to 13 were as shown in Table 6.

TABLE 6

Amount of catalyst components carried per liter of finished catalyst (g/liter)

| Catalyst | Pd | Rh | CeO₂ | ZrO₂ | Fe₂O₃ | Al₂O₃ | Total amount carried |
|---|---|---|---|---|---|---|---|
| Example 8 | — | 0.1 | 5.2 | 14.8 | — | 80 | 100.1 |
| Example 9 | — | 0.1 | 6.7 | 43.3 | — | 50 | 100.1 |
| Control 7 | — | 0.1 | 5.2 | 14.8 | — | 80 | 100.1 |
| Control 8 | — | 0.1 | 10 | 30 | — | 60 | 100.1 |
| Control 9 | — | 0.1 | 5.2 | 14.8 | — | 80 | 100.1 |
| Control 10 | — | 0.1 | 5.5 | 74.5 | — | 20 | 100.1 |
| Control 11 | — | 0.1 | 12.7 | 2.3 | — | 85 | 100.1 |
| Example 10 | 1.0 | 0.2 | 12.6 | 17.8 | 1.8 | 107.6 | 141.0 |
| Example 11 | 1.0 | 0.2 | 11.5 | 18.9 | 1.8 | 107.6 | 141.0 |
| Example 12 | 1.0 | 0.2 | 12.6 | 17.8 | 1.8 | 107.6 | 141.0 |
| Control 12 | 1.0 | 0.2 | 12.6 | 17.8 | 1.8 | 107.6 | 141.0 |
| Control 13 | 1.0 | 0.2 | 12.6 | 17.8 | 1.8 | 107.6 | 141.0 |

EXAMPLE 13

The catalyst of Example 8 to 12 and the catalysts of Controls 7 to 13 were tested for catalytic activity after a durability test in an engine.

The durability test was formed by use of a commercially available electronically controlled engine (8 cylinders 4,400 cc), with a multi-converter filled with a sample catalyst and connected to the exhaust system of the engine. The engine was operated by a mode of 60 seconds' steady driving and 6 seconds' decelerated driving (during which period the fuel was cut and the catalyst was exposed to harsh conditions of an oxidizing atmosphere at elevated temperature), to age the catalyst for 50 hours under conditions such that the catalyst inlet gas temperature during the steady driving would reach 800° C.

The evaluation of the aged catalyst for catalytic performance was carried out by use of a commercially available electronically controlled engine (4 cylinders, 1,800 cc), with a multi-converter filled with a sample catalyst and connected to the exhaust system of the engine. The performance of the catalyst was evaluated under the conditions of catalyst inlet gas temperature of 450° C and a space velocity of 90,000 hr⁻¹. In this case, a 1—Hz sine wave form signal from an external oscillator was fed into a control unit of the engine to effect continuous change of the average air/fuel ratio, with the air/fuel ratio (A/F) fluctuated within the range of ±0.5 A/F and 1 Hz. In the meantime, the gas sampled at the inlet and outlet of the catalyst was analyzed to find the ratios of removal of CO, HC, and NO$_x$ for the average air/fuel ratio, A/F, in the range of 15.1 to 14.1.

A three way characteristic curve was obtained by plotting on a graph the data of the ratio of removal of CO, HC, and NO$_x$ obtained as described above vs. the inlet air/fuel ratio The ratio of purification at the intersection of the curves of ratios of removal of CO and NO$_x$ (hereinafter referred to as "crossover point") and the ratio of removal of HC at the A/F value of that crossover point were found from the three way characteristic curve to be used as criteria for the evaluation of the three way performance of the catalyst.

The evaluation of the catalyst with respect to the purification capacity at low temperatures was carried out by operating the engine with the average air/fuel ratio, A/F, fixed at 14.6 and the air/fuel ratio fluctuated within the range of ± 0.5 A/F and 1 Hz, continuously changing the catalyst inlet gas temperature from 200° to 500° C by means of a heat-exchanger disposed before the catalyst converter in the exhaust system of the engine, simultaneously analyzing the gas sampled at the inlet and outlet of the catalyst, and determining the ratios of removal of CO, HC, and NO$_x$.

The data consequently obtained on the ratios of removal of CO, HC, and NO$_x$ vs. the catalyst inlet gas temperature were plotted on a graph. The catalyst inlet gas temperature at which the ratio of purification reached 50% (R₅₀) was found from the curve of the graph and used as a criterion for the evaluation of the catalyst's purification ability at low temperatures.

The results of the evaluation of catalyst performance obtained by the method described above were as shown in Table 7.

TABLE 7

Results of evaluation of catalyst performance after durability test with engine

| Catalyst | Three way performance Crossover point | | Purification ability at low temperature | | |
|---|---|---|---|---|---|
| | Ratios of removal of CO and NO (%) | Ratio of removal of HC (%) | Ratio of removal of CO T 50 (°C.) | Ratio of removal of HC T 50 (°C.) | Ratio of removal of NOx T 50 (°C.) |
| Example 8 | 96.5 | 92.6 | 345 | 349 | 343 |
| Example 9 | 95.8 | 91.6 | 351 | 357 | 349 |
| Control 7 | 50.8 | 51.2 | 428 | 425 | 436 |
| Control 8 | 60.5 | 58.6 | 415 | 416 | 424 |
| Control 9 | 45.6 | 48.2 | 424 | 418 | 415 |
| Control 10 | 72.5 | 65.8 | 408 | 412 | 401 |
| Control 11 | 61.8 | 57.4 | 414 | 417 | 409 |

TABLE 7-continued

Results of evaluation of catalyst performance after durability test with engine

| Catalyst | Three way performance Crossover point | | Purification ability at low temperature | | |
|---|---|---|---|---|---|
| | Ratios of removal of CO and NO (%) | Ratio of removal of HC (%) | Ratio of removal of CO T 50 (°C.) | Ratio of removal of HC T 50 (°C.) | Ratio of removal of NOx T 50 (°C.) |
| Example 10 | 98.1 | 95.3 | 342 | 341 | 330 |
| Example 11 | 98.8 | 98.2 | 328 | 334 | 319 |
| Example 12 | 99.2 | 96.8 | 336 | 343 | 321 |
| Control 12 | 82.8 | 83.5 | 421 | 427 | 409 |
| Control 13 | 85.6 | 82.1 | 404 | 406 | 409 |

It is clearly noted from Table 7 that the catalysts of this invention containing a ceria-zirconia compound having a platinum-family metal and ceria incorporated in the form of a solid solution in zirconia in a concentration in the range of 10 to 50% by weight as contemplated by the present invention exhibit highly satisfactory catalyst performance as compared with the conventional catalyst using ceria and zirconia.

From the results described above, it is noted that the catalyt offered by the present invention possesses an outstanding purification ability and, at the same time, retains high durability even under such harsh conditions as experienced in an oxidizing atmosphere at an elevated temperature.

EXAMPLE 14

With a solution in 100 ml of water of 50 g of cerium nitrate [Ce(NO$_3$)$_3$6H$_2$O], 50 g of minute particles of zirconia having a specific surface area of 97 m$^2$/g were impregnated. The impregnated particles were thoroughly dried and then calcined at 500° C for one hour. (The product was labelled as Sample No. 6)

EXAMPLE 15

With a solution in 100 ml of water of 50 g of cerium nitrate [Ce(NO$_3$)$_3$6H$_2$O] and 1.7 g of yttrium nitrate [Y(-No$_3$)$_3$6H$_2$)], 50 g of the same minute particles of zirconia as in Example 14 were impregnated. The impregnated particles were thoroughly dried and then calcined at 500° C for one hour. (The product was labelled as Sample No. 7.)

EXAMPLE 16

With a solution in 100 ml of water of 50 g of cerium nitrate [Ce(NO$_3$)$_3$6H$_2$O] and 3.4 g of yttrium nitrate [Y(NO$_3$)$_3$6H$_2$O], 50 g of minute particles of zirconia having a specific surface area of 97 m$^2$/g were impregnated. The impregnated particles were thoroughly dried and then calcined at 500° C for one hour. (The product was labelled as Sample No. 8.)

EXAMPLE 17

Sample No. 9 was obtained by following the procedure of Example 16, except that the amount of yttrium nitrate was changed to 6.8 g.

EXAMPLE 18

Sample No. 10 was obtained by following the procedure of Example 16, except that 8.4 g of calcium nitrate [Ca(NO$_3$)$_2$4H$_2$O] was used in place of yttrium nitrate.

EXAMPLE 19

With solution in 100 ml of water of 50 g of cerium nitrate, 3.4 g of yttrium nitrate and 8.4 g of calcium nitrate, 50 g of the same minute particles of zirconia as in Example 14 was impregnated. The impregnated particles were thoroughly dried and then calcined at 500° C for 1 hour. (The product was labelled as Sample No. 11)

Control 14

Sample g was obtained by following the procedure of Example 16, except that zirconia having a specific surface area of 40 m$^2$/g was used instead.

Control 15

Sample h was obtained by following the procedure of Example 17, except that the addition of cerium nitrate was omitted

Control 16

Sample i was obtained by following the procedure of Example 16, except that 50 g of γ-alumina having a specific surface area of 150 m$^2$/g was used in place of zirconia.

EXAMPLE 20

[1]The cerium oxide-containing powders of Samples No. 6 to 11 and Samples g to i obtained respectively in Examples 14 to 19 and Controls 14 to 16 and a commercially available ceria of a large specific surface area (85 m$^2$/g) were treated in an electric oven at 1,000° C. for tn hours and subjected to X-ray diffraction and tested for BET surface area The results were as shown in Table 8.

The cerium oxide-containing powders cf Example 14 to 19 showed no growth of CeO$_2$ even after the treatment at the elevated temperature and further exhibited stable BET surface area due to addition of yttrium and/or calcium.

Figure 5:
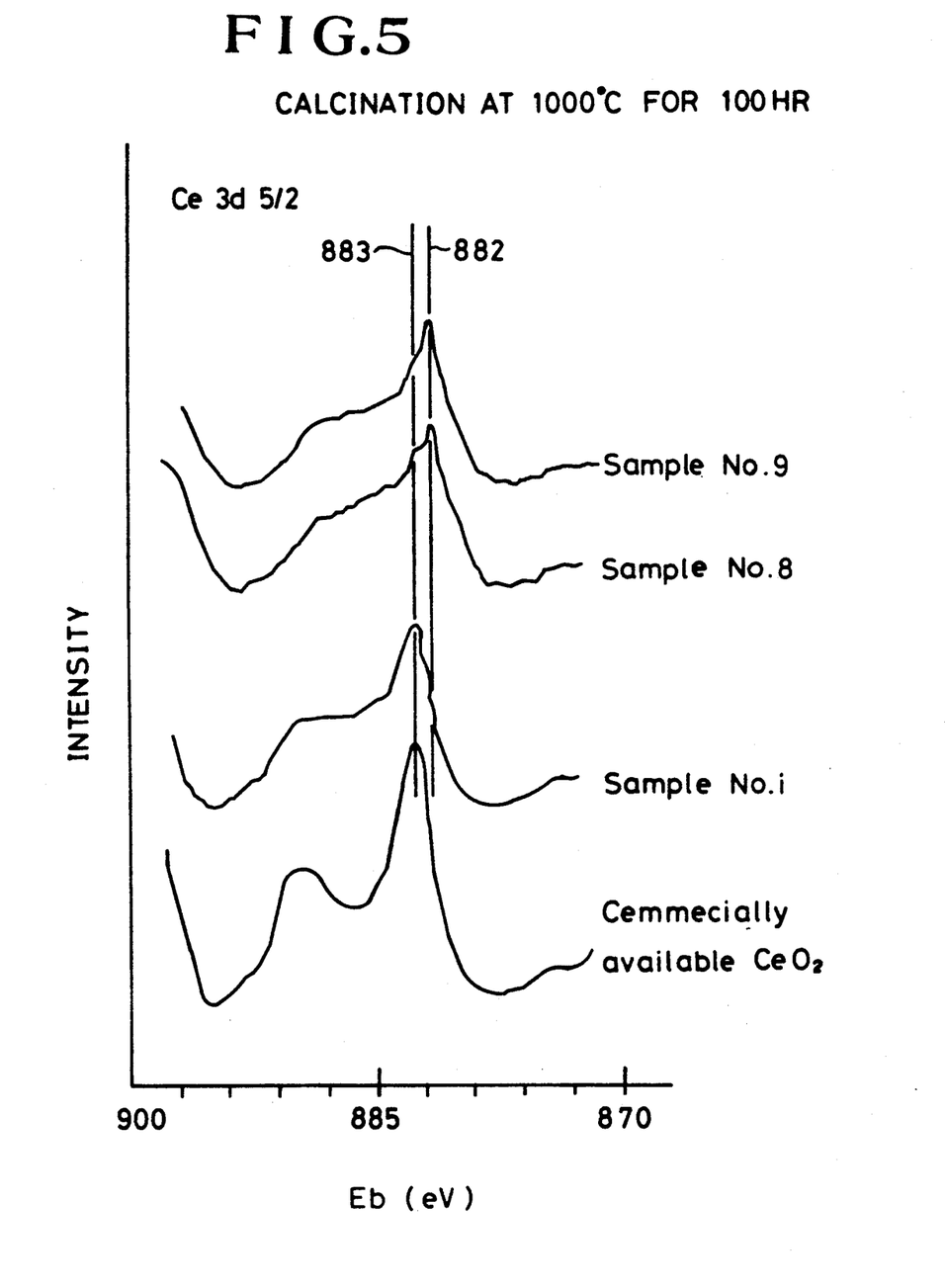
FIG. 5 is a chart showing the results of determination of the bond energy of Ce 3d 5/2 as measured of the ceria used in the catalyst of this invention and in the catalysts for comparison with an X-ray photoelectric spectroscope.

[2] The samples Nos. 8 and 9, the sample i, and commercially available cerium oxide were tested for XPS. The results were as shown in FIG. 5. It is noted from FIG. 5 that the cerium oxides obtained in the working examples of this invention show a shift from the ordinary 3d peak of Ce toward the lower bond energy side. The fact that the bond energy is shifted toward the lower energy side means that the oxidation number of Ce is increased. It is, therefore, logical to infer that the addition of yttrium results in the formation of a Ce seed of an enhanced state of oxidation.

TABLE 8

Results of X-ray diffraction test (1,000° C. × 10 hours' calcination)

| Sample | Composition | Component and crystalline system maximum X-ray diffraction peak | B.E.T SA(m²/g) |
|---|---|---|---|
| 6 | $ZrO_2$ 50: $CeO_2$ 20 | $ZrO_2$ (tetragonal) | 12.6 |
| 7 | $ZrO_2$ 50: $CeO_2$ 20: $Y_2O_3$ 1 | $ZrO_2$ (tetragonal) | 17.9 |
| 8 | $ZrO_2$ 50: $CeO_2$ 20: $Y_2O_3$ 2 | $ZrO_2$ (tetragonal) | 23.1 |
| 9 | $ZrO_2$ 50: $CeO_2$ 20: $Y_2O_3$ 4 | $ZrO_2$ (tetragonal) | 20.8 |
| 10 | $ZrO_2$ 50: $CeO_2$ 20: —: CaO 2 | $ZrO_2$ (tetragonal) | 18.4 |
| 11 | $ZrO_2$ 50: $CeO_2$ 20: $Y_2O_3$ 2: $CaO_2$ | $ZrO_2$ (tetragonal) | 22.5 |
| g | $ZrO_2$ 50: $CeO_2$ 20: $Y_2O_3$ 2 | $ZrO_2$ (monoclinic) $CeO_2$ | 5.4 |
| h | $ZrO_2$ 50: —: $Y_2O_3$ 4 | $ZrO_2$ (tetragonal) | 10.3 |
| i | $Al_2O_3$ 50: $CeO_2$ 20: $Y_2O_3$ 2 | , $Al_2O_3$, $CeO_2$ | 54.9 |
| Commercially available $CeO_2$ | — | $CeO_2$ | 3.4 |

EXAMPLE 21

An alumina powder containing platinum and rhodium was obtained by impregnating 200 g of activated alumina having a specific surface area of 150 m²/g with a mixture of an aqueous solution of dinitrodianmine platinic nitrate containing 1.5 g of platinum and an aqueous solution of rhodium nitrate containing 0.3 g of rhodium, thoroughly drying the impregnated activated alumina, and calcining the dry alumina in the air at 400° C. for two hours.

Then, in a ball mill, the platinum-family metal containing alumina obtained as described above and 100 g of the cerium oxide-containing powder obtained in Example 14 were blended with water and nitric acid to prepare an aqueous slurry.

A finished catalyst No. 12 was obtained by coating monolithic carriers (33 mm in diameter and 110 mm in length) of cordielite with the aqueous slurry and then drying the coated carriers at 130° C for three hours. The amount of the slurry coting of the finished catalyst was 150 g/liter.

EXAMPLES 22 TO 26 AND CONTROLS 17 to 19

Finished catalyst Nos. 13 to 17 and No. j to 1 were obtained by following the procedure of Example 21, except that the cerium oxide-containing powder obtained in Examples 15 to 19 and Controls 14 to 16 were used in such amounts as shown in Table 8.

Control 20

A finished catalyst No. m was obtained by following the procedure of Example 21, except that 100 g of a commercially awailable ceria (85 m²/g) was used instead.

EXAMPLE 20

The catalysts Nos. 12–17, and the catalysts Nos. j–m of Controls were sujbected to the durability test with an engine and then tested for catalytic performance.

The durability test was performed by use of an electronically controlled engine (8 cylinders, 4,400 cc). The engine was operated by a mode of 60 seconds' steady driving and 6 seconds' decelerated driving (during which period the fuel was cut and the sample catalyst was exposed to an oxidizing atmosphere at an elevated temperature) and the sample catalyst as aged for 50 hours under the conditions such that the catalyst temperature reached 900° C. in the steady driving.

The evaluation of the catalyst was performed by use of an electronically controlled engine by continuously changing the temperature from 200° C to 450° C. by means of a heat-exchanger and simultaneously determining the catalyst inlet gas temperature for the ratios of removal of CO, HC, and $NO_x$ to reach 50% ($T_{50}$) and the ratio of removal of the components at 450° C. The results were as shown in Table 9.

It is clearly noted from Table 9 that the catalysts according to the present invention retain highly desirable durability even under harsh conditions as experienced in an oxidizing atmosphere at elevated temperatures owing to the stabilization of cerium oxide.

TABLE 9

| Catalyst No. | 50% conversion temperature (°C.) | | | Ratio of purification at 450° C. (%) | | |
|---|---|---|---|---|---|---|
| | CO | HC | NO | CO | HC | NO |
| 12 | 358 | 363 | 356 | 88 | 85 | 89 |
| 13 | 341 | 348 | 338 | 92 | 86 | 93 |
| 14 | 337 | 341 | 332 | 94 | 86 | 94 |
| 15 | 329 | 334 | 322 | 95 | 90 | 94 |
| 16 | 334 | 340 | 329 | 94 | 86 | 94 |
| 17 | 327 | 331 | 319 | 95 | 90 | 94 |
| j | 389 | 394 | 382 | 79 | 80 | 81 |
| k | 365 | 367 | 360 | 68 | 75 | 69 |
| l | 397 | 403 | 395 | 63 | 72 | 66 |
| m | 403 | 412 | 401 | 72 | 68 | 73 |

Air/fuel ratio of exhaust gas from engine, A/F, = 14.6 ± 0.5, 1 Hz. Temperature increasing speed 10° C./min.

What is claimed is:

1. A catalyst for purifying exhaust gas produced by coating honeycomb carriers of monolithic structure with a catalyst composition comprising [10-50% by weight of ](1) cerium oxide particles dispersed on (a) zirconia or (b) zirconia and at least one member selected from the group consisting of yttria and calcia, said dispersed particles being obtained by impregnating zirconium oxide or hydroxide having a specific surface area of from 60–200 mg. with a solution of (i) a cerium salt or (ii) a cerium salt and at least one salt selected from the group consisting of yttrium salts and calcium salts, drying and then calcining the resultant impregnated particles, wherein said cerium oxide is contained in a range of 10 to 50% by weight based on said zirconia and the chart of the x-ray diffraction spectrum thereof does not show a peak for the crystalline form of cerium oxide, (2) refractory inorganic oxide particles, (3) 0.02 to 2% by weight of rhodium and (4) 0 to 10% by weight of at least one platinum-family metal selected from the group consisting of platinum and palladium, based on said catalyst composition.

2. A catalyst according to claim 1, wherein the chart of the x-ray diffraction spectrum of said impregnated particles after 10 hours calcination in air at a temperature of 900° C. shows a peak for the tetragonal crystal of zirconia, and no peak for cerium oxide, and said cerium oxide is incorporated substantially in the form of solid solution with (a) zirconia or (b) zirconia and at least one member selected from the group consisting of yttria and calcia.

3. A catalyst according to claim 1, wherein said catalyst composition contains said impregnated particles in the range of 10 to 80% by weight.

4. A catalyst according to claim 1, wherein said rhodium is carried on at least one type of particle selected from the group consisting of said impregnated particles and said refractory inorganic oxide particles.

5. A catalyst according to claim 4, wherein said rhodium is carried in an amount in the range of 1 to 20% by weight based on the weight of said refractory inorganic oxide.

6. A catalyst according to claim 4, wherein said rhodium carrying refractory inorganic oxide is contained in said catalyst composition in the form of aggregate particles having an average diameter in the range of 0.5 to 20 μm.

7. A catalyst according to claim 1, wherein said refractory inorganic oxide comprises at least one member selected from the group consisting of activated alumina, silica, titania, and zirconia.

8. A catalyst according to claim 7, wherein said refractory inorganic oxide comprises activated alumina.

9. A catalyst according to claim 8, wherein said activated alumina further contains at least one oxide selected from the group consisting of cerium, yttrium, lanthanum, neodymium, zirconium, iron, barium, nickel, and cobalt oxides.

10. A catalyst according to claim 1, wherein said dispersed cerium oxide is dispersed on zirconia.

11. A catalyst according to claim 1, wherein the amount of said platinum-family metal selected from the group consisting of platinum and palladium is in the range of 0.001 to 5% by weight based on the weight of said catalyst composition.

12. A catalyst according to claim 1, wherein said catalyst composition comprises refractory inorganic oxide particles carrying no rhodium.

13. A catalyst according to claim 12, wherein said platinum-family metal selected from the group consisting of platinum and palladium is carried on at least one member selected from the group consisting of said rhodium-carrying refractory inorganic oxide, said impregnated particles, and said refractory inorganic oxide carrying no rhodium.

14. A catalyst according to claim 12, wherein said refractory inorganic oxide carrying no rhodium comprises at least one member selected from the group consisting of activated alumina and silica.

15. A catalyst according to claim 14, wherein said refractory inorganic oxide comprises activated alumina.

16. A catalyst according to claim 15, wherein said activated alumina further contains the oxide of at least one member selected from the group consisting of cerium, yttrium, lanthanum, neodymium, zirconium, iron, barium, nickel, and cobalt oxides.

17. A catalyst according to claim 1, wherein said platinum-family metal selected from the group consisting of platinum and palladium is carried on at least one member selected from the group consisting of said rhodium-carrying refractory inorganic oxide and said impregnated particles.

18. A catalyst according to claim 1, wherein the amount of said catalyst composition carried is in the range of 50 to 300 g per liter of said carrier.

19. A catalyst according to claim 1, wherein said rhodium and said platinum metal selected from the group consisting of platinum and palladium are carried on at least one member selected from the group consisting of said impregnated particles and said refractory inorganic oxide particles.

20. A catalyst according to claim 19, wherein said catalyst composition further comprises refractory inorganic oxide particles carrying no rhodium.

21. A catalyst according to claim 20, wherein said refractory inorganic oxide is comprises activated alumina.

22. A catalyst according to claim 21 wherein said refractory inorganic oxide further comprises at least one oxide selected from the group of oxides consisting of cerium, yttrium, lanthanum, neodymium, zirconium, iron, barium, nickel and cobalt oxides.

23. A catalyst according to claim 1, wherein said cerium oxide particles are contained in a concentration range of (a) 10 to 50% by weight as cerium oxide or the combination of said cerium oxide particles and yttria or calcia are contained in a concentration range of (b) 10 to 50% by weight as cerium oxide and 0.5 to 15% by weight as yttria or calcia, based on the amount of zirconia, and the chart of the x-ray diffraction spectrum analysis thereof does not show a peak for the crystalline form of cerium oxide.

24. A catalyst according to claim 1, wherein said rhodium is carried on said refractory inorganic oxide particles.

25. A method for the production of a catalyst according to claim 1 which comprises preparing a catalyst composition composed of a refractory inorganic oxide havign hrodium carried their on in an amount in the range of 0.02 to 2% by weight based on the amount of said catalyst composition, cerium oxide particles dispersed on (a) zirconia or (b) zirconia and at least one member selected from the group consisting of yttria and calcia, and refractory inorganic oxide particles having carried thereon 0 to 10% by weight, based on the amount of said catalyst composition, of at least one platinum-family metal selected from the group consisting of platinum and palladium, converting said catalyst composition into an aqueous slurry, coating honeycomb carriers of monolithic structure with said aqueous slurry, and subsequently drying the resultant coated carrier to obtain the catalyst.

* * * * *

UNITED STATES PATENT AND TRADEMARK OFFICE
CERTIFICATE OF CORRECTION

PATENT NO. : 5,015,617
DATED : May 14, 1991
INVENTOR(S) : Ohata, et al

It is certified that error appears in the above-indentified patent and that said Letters Patent is hereby corrected as shown below:

Col. 18, lines 46-47, delete "10-50% by weight of" should read --10-15% by weight of--.

Col. 18, line 52, delete "60-200mg" should read --60-200m$^2$/g--.

Signed and Sealed this

Twenty-sixth Day of July, 1994

Attest:

BRUCE LEHMAN

*Attesting Officer*     *Commissioner of Patents and Trademarks*